Sept. 23, 1952          H. W. KRUSE          2,611,674
CLIP STORING AND DISPENSING DEVICE
Filed April 24, 1948          3 Sheets-Sheet 1
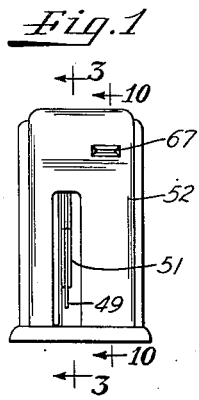
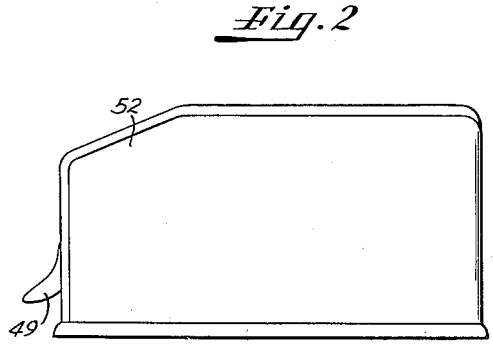
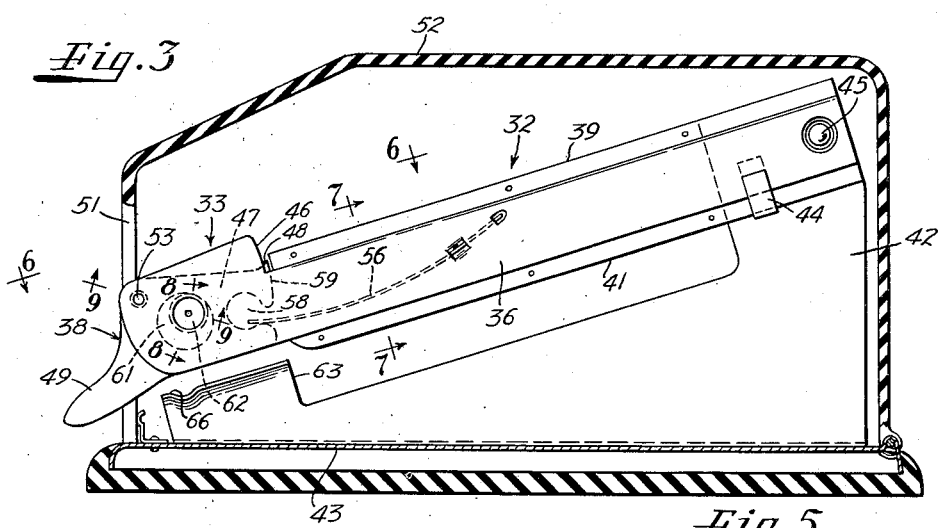
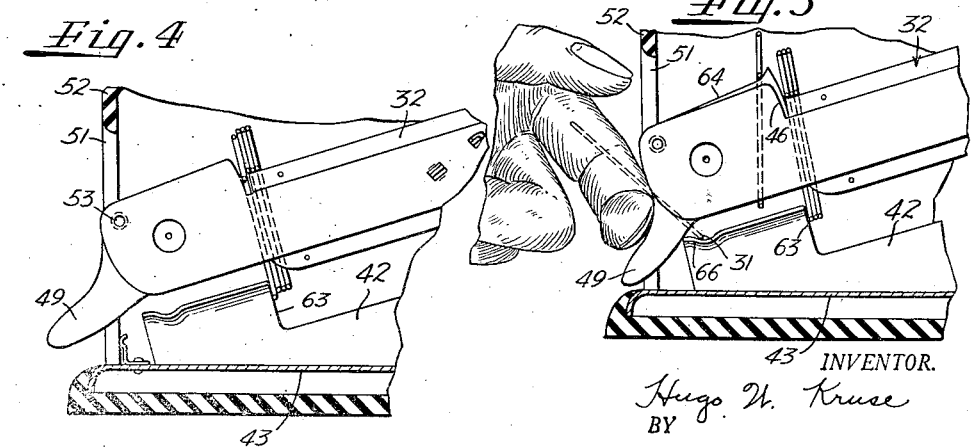
INVENTOR.
Hugo W. Kruse
BY
McCanna and Morsbach
ATTYS Sept. 23, 1952 — H. W. KRUSE — 2,611,674
CLIP STORING AND DISPENSING DEVICE
Filed April 24, 1948 — 3 Sheets-Sheet 2
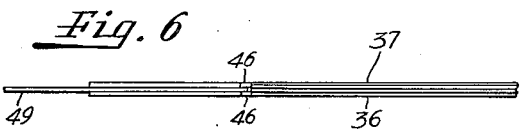
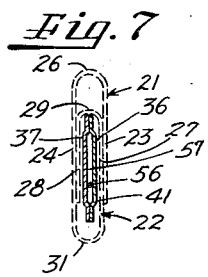
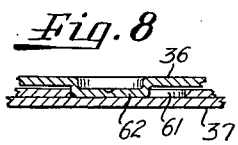
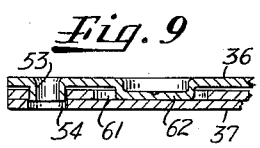
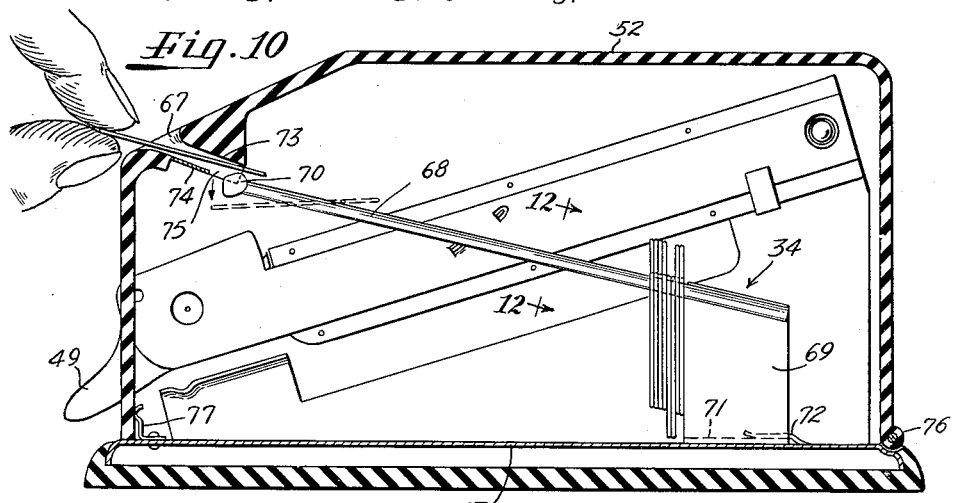
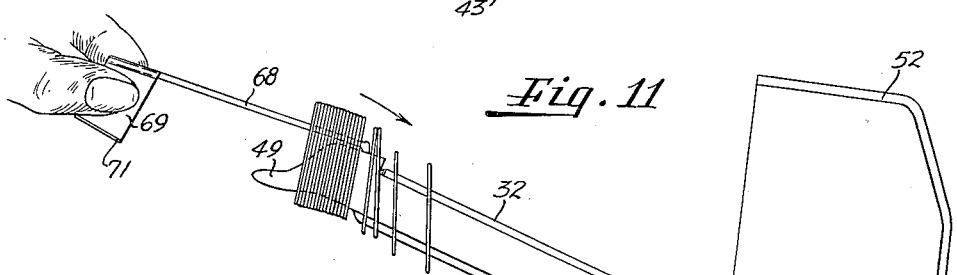
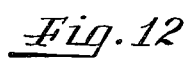
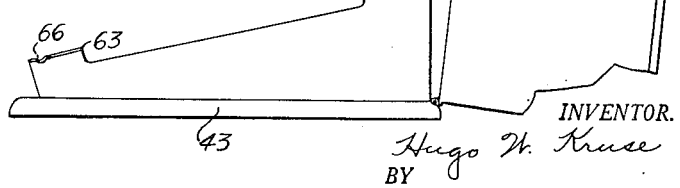
INVENTOR.
Hugo W. Kruse
BY McCanna and Morsbach
ATTYS.

Sept. 23, 1952        H. W. KRUSE        2,611,674
CLIP STORING AND DISPENSING DEVICE
Filed April 24, 1948        3 Sheets—Sheet 3
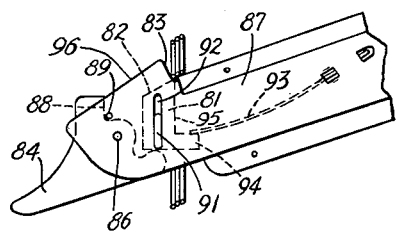
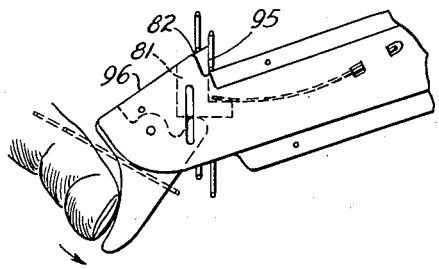
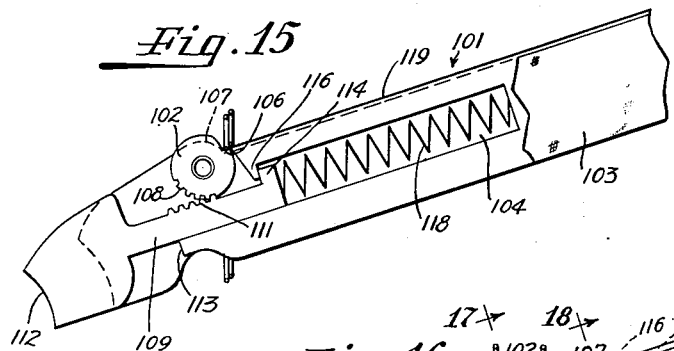
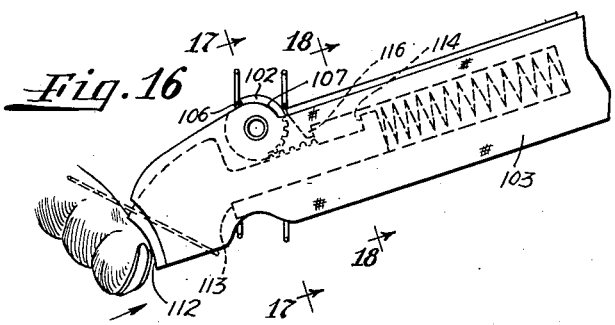
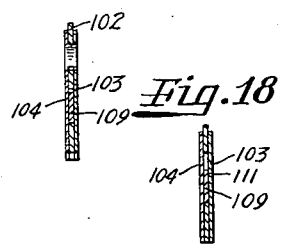
INVENTOR.
Hugo W. Kruse
BY
McCanna and Morsbach
ATTYS.

Patented Sept. 23, 1952

2,611,674

UNITED STATES PATENT OFFICE 2,611,674

CLIP STORING AND DISPENSING DEVICE

Hugo W. Kruse, Rockford, Ill.

Application April 24, 1948, Serial No. 23,073

12 Claims. (Cl. 312—63)

1

This invention relates to a storage and dispensing device designed particularly for storing and dispensing paper clips but suitable for storing and dispensing other articles such as hairpins, staples and the like.

In most offices clips are contained in the boxes in which they were purchased or they are disposed in an open container in a haphazard manner. In either case the clips tend to interlock with each other, and consequently it is difficult for a person to obtain a single clip from the container. Too, containers in many instances simply serve as catch-alls for all types of small office equipment and when such equipment is placed on top of the clips the difficulty of obtaining a clip by itself from the container is increased.

An object of the invention is to provide a novel storing and dispensing mechanism for paper clips and the like in which the clips are available one at a time when desired by the manipulation of a single delivery mechanism.

Another object of the invention is to provide a dispenser of the above character having means for storing a plurality of clips in a magazine and novel means for delivering a single clip from the magazine at the will of the operator.

Another object of the invention is the provision in a storing and dispensing mechanism of the above character of means for placing the clip being discharged from the mechanism in a position to be readily grasped by the operator.

Another object of the invention is the provision in a storing and dispensing mechanism of the above character of means for storing used clips and the like in position for recharging the magazine.

Another object of the invention is to provide a novel storing and dispensing mechanism of the above character which keeps the clips clean and ready for use and which also forms a neat, attractive, utilitarian piece of office equipment.

Another object of the invention is the provision in a storing and dispensing mechanism wherein the clip storing means is constructed to receive and arrange the clips in position for delivery to the magazine and the magazine and clip storing means are constructed for delivery of clips in a body from one to the other.

Another object of the invention is to provide a storing and dispensing device of the above character which is simple in construction, positive in action and relatively inexpensive to manufacture.

Other objects and advantages of the invention

2 will become apparent from the following detailed description taken in connection with the accompanying drawings, in which—

Figure 1 is a front elevation of a clip storing and dispensing mechanism embodying the present invention;

Fig. 2 is a side elevational view of Figure 1;

Fig. 3 is a sectional view taken substantially along the line 3—3 of Figure 1;

Fig. 4 is a fragmentary sectional view similar to Fig. 3 showing the clips disposed in the magazine in position for dispensing;

Fig. 5 is a view similar to Fig. 4 illustrating the position of the parts when a clip is being ejected from the magazine;

Fig. 6 is a sectional view taken substantially along the line 6—6 of Fig. 3;

Fig. 7 is a sectional view taken substantially along the line 7—7 of Fig. 3;

Fig. 8 is a sectional view taken substantially along the line 8—8 of Fig. 3;

Fig. 9 is a sectional view taken substantially along the line 9—9 of Fig. 3;

Fig. 10 is a sectional view showing the clip storing means;

Fig. 11 is a view showing the position of the parts for transferring the clips from the storing means to the magazine;

Fig. 12 is a sectional view taken along the line 12—12 of Fig. 10;

Fig. 13 shows a modified form of an ejector mechanism;

Fig. 14 is a view similar to Fig. 13 showing the position of the parts upon ejection of a clip;

Fig. 15 is a further modified form of an ejector mechanism;

Fig. 16 is a view similar to Fig. 15 with the ejector mechanism in a position to eject a clip;

Fig. 17 is a sectional view taken substantially along the line 17—17 of Fig. 16; and Fig. 18 is a sectional view taken substantially along the line 18—18 of Fig. 16.

Referring now to the drawings the invention is shown embodied in a storing and dispensing mechanism for paper clips, staples, hairpins, and the like. For purposes of illustration the mechanism to be hereinafter described is for clips of the type commonly known as Gem clips (see Figs. 7 and 12) comprising two elongated inverted U-shaped members 21 and 22 disposed in the same plane. The U-shaped member 21 is formed by spaced leg portions 23 and 24 and a bridging portion 26 and the U-shaped member 22 is formed by spaced leg portions 27 and 28 and a bridging portion 29. The two U-shaped members are interconnected by a bridging portion 31 joining the leg 27 with the leg 24.

In general the clip storing and dispensing mechanism comprises a magazine 32 on which paper clips are disposed in side by side suspended relation, an ejector mechanism 33 for ejecting clips in succession from the magazine 32 and a storing means 34 for storing clips. The magazine 32 and the ejector mechanism 33 are formed in this instance (see Figs. 3 and 7) by two spaced side members 36 and 37 and a trigger mechanism disposed at one end of the spaced members. The members 36 and 37 are secured together as by spot welding a portion of the upper and lower edges 39 and 41, respectively. The upper edge 39 is shaped to support the clips in side by side suspended relation and to permit the free sliding of the clips therealong. At the end of the members 36 and 37 opposite the trigger mechanism 38, the members are pivotally mounted, as by a pin 45, on a support 42 secured to a base 43. A tab 44, pressed out of the support 42, engages the lower edge 41 and the side of the member 36 to provide a rest and to secure the magazine in a desired position. The tab 44 herein is disposed below the pin 45 so that the magazine 32 is inclined and the clips feed from the upper end of the magazine to the lower end by gravity. The clips are retained in the magazine 32 by spaced shoulders 46, respectively, formed on the members 36 and 37 intermediate the ends thereof.

The trigger mechanism includes a bell crank lever 38 received between the lower ends of the spaced members and supported thereby. The lever comprises an arm 47 having an end or pawl portion 48 extending beyond the shoulders 46 to engage the clip abutting the shoulders 46 and an arm 49 projecting outwardly from the spaced members to project through an elongated slot 51 formed in a casing 52. The bell crank lever 38 is pivotally mounted as by deforming the side member 36 to form a tubular projection 53 (see Figs. 8 and 9) extending through an opening 54 in the bell crank lever to support the latter and provide an axis of rotation therefor. The end portion 48 of the arm 47 is urged to a position in which the end portion 48 is slightly below alinement with the top edge 39 of the magazine 32 by a spring 56 disposed in the space 57 (see Fig. 7) between the members 36 and 37. At one end the spring 56 is anchored to the member 36 and at its opposite end the spring 56 engages the side wall of a recess 58 formed at the extreme end 59 of the arm 47 of the bell crank lever. Movement of the lever is limited in either direction by engagement of the edge of an opening 61 formed in the lever with the side walls of a projection 62 pressed out of the member 36 to project into the opening 61. Downward movement of the arm or trigger 49 about the pivotal axis of the bell crank lever moves the pawl portion 48 of the arm 47 upward. Such movement raises the clip adjacent the shoulders 46 to a position at which the clip is free to pass over the shoulders.

During the ejection of a clip from the magazine 32 the clips adjacent the clip being ejected are maintained in a fixed position so that the clip being ejected may be moved out of frictional engagement with the remaining clips in the magazine to facilitate the ejection of the clip. To this end the shoulders 46 are curved generally upwardly and axially outwardly away from the top edge 39 of the magazine 32. The extreme end 59 of the arm 47 is generally rounded so that as the end portion 48 moves upwardly to eject a clip the end 59 slidably engages the next clip in the magazine and holds it as well as the remaining clips in the magazine in a fixed position. A shoulder 63 (see Fig. 5) rigid with the support 42 may be disposed to engage the lower portion of the clip abutting against the shoulders 46. When the clip being ejected is raised a predetermined distance the clip clears the shoulder 63 and is supported on the pawl portion 48 solely by the bridging portion 29 of the clip as shown by the dotted line position of the clip. The remaining clips in the magazine however in this instance are held in a fixed position by the end 59 of the arm 47 together with the abutment 63.

Upon clearing the shoulders 46 the clip slides down along the upper edge 64 of the arm 47 to the opening 51 in the casing 52. Although the end portion 48 of the arm 47 is shaped primarily to force the clip into engagement with the shoulders 46 as the clip is being ejected from the magazine 32, this construction is also advantageous in other respects. Thus, when the arm 47 is in its upper position as shown in Fig. 5 the end portion 48 extends slightly above the shoulders 46 and is inclined abruptly with respect to the inclined upper edge 64 of the arm 47. As a result after the clip clears the shoulders 46 it is forcibly started down along the arm 47. A lip or shoulder 66 may be provided beneath the trigger mechanism to engage the bridging portion 31 of the clip as the latter is sliding to the opening 51. This construction insures that the upper portion of the clip tips so that the clip falls across the finger of the operator as shown in Fig. 5 as the clip is discharged through the opening 51 in the casing 52.

The means for storing the clips is best seen in Figs. 10–12. Thus, to store clips the latter are fed endwise into an opening 67 in the upper portion of the casing 52 to be threaded on a suitable inclined member 68 disposed on the interior of the casing so that clips fed through the opening slide down along the member 68 by gravity. The member 68 is formed herein by an elongated rod. At its lower end the rod 68 is supported in a cantilever fashion by a bracket 69 and at its opposite end is disposed adjacent the opening 67 so that clips inserted therethrough are threaded on to an upper end 70 of the rod. The bracket 69 is formed with a base 71 and a clip 72, pressed out of the base 43, engages the base 71 to removably secure the bracket 69 and the elongated rod 68 in position. To facilitate threading of the clips on to the rod 68 the opening 67 is generally rectangular in shape to insure that the clips are fed flatwise through the casing 52 and is provided with suitable upper, lower, and side guide surfaces 73, 74 and 75, respectively, extending inwardly of the casing 52. As shown in Fig. 10 the upper guide surface 73 is in spaced relation with the free end of the rod so that when the clip is inserted the surface 73 prevents lateral tilting of the clip until the rear end of the clip passes beyond the surface 74 and drops down between the surface 74 and the end 70. The guide surfaces 75, only one of which is shown, prevent sidewise displacement of the clip. The free end 70 of the rod 68 is flattened or formed with a knob to provide a guide that prevents the clip from falling to either side of the rod as the clip is being fed through the opening 67 before the rear edge of the clip clears the lower guide surface 74. The upper side of the end 70 is also disposed slightly above the plane of the surface 74 to facilitate entry of the rear end of the clip between the surface 74 and the end 70. Either end of a clip may be fed through the opening 67 first. Where the same end of each clip is fed through the opening, the clips are stored on the rod 68 in a uniform manner; however, where no particular attention is paid to the manner in which the clips are fed to the rod 68, the clips will be stored on the rod as shown in Fig. 10, in a non-uniform manner. Before the clips can be transferred to the magazine, to be described hereinafter, the clips must be first rotated on the rod so that they are brought into a uniform relationship as shown in Fig. 11.

The casing 52 is mounted to be moved relative to the magazine 32, ejector mechanism 33 and the storing means 34 so that the respective components are accessible. As shown in Fig. 10 the casing 52 is hinged at one end by a hinge 76. At the opposite end of the casing 52 a spring catch 77 secured to the base 43 frictionally engages the casing 52 and maintains the latter in a closed position such as shown in Fig. 10. To raise the casing 52 it is only necessary to apply a sufficient force to the casing 52 to overcome the force of the catch 77.

The clips in the storage mechanism 34 may be readily transferred to the magazine 32. To effect this, the casing 52 and the ejector mechanism 33 and the magazine mechanism 32 are raised to the position shown in Fig. 11. The bracket 69 is then grasped between the thumb and finger of one of the hands of the operator and disengaged from the clip 72. It is to be understood that with this construction either end of the clip may be fed through the opening 67 first. However before the clips can be transferred to the magazine 32, the clips must be first rotated so that corresponding ends of the respective clips are all either on the top or the bottom of the rod 68. After the clips are alined the rod 68 is then positioned as shown in Fig. 11 to be in alinement with the magazine 32. The flattened portion 70 on the end of the rod 68 is disposed between the spaced members 36 and 37 adjacent the shoulders 46. The rod 68 is then inclined so that the clips slide down over the trigger mechanism 38 to the magazine 32.

The operation of the dispenser is readily apparent from the above but is briefly summarized hereinafter. It is assumed that the magazine has been filled with clips and that the parts on the dispenser are in the position shown in Fig. 10. When a clip is desired the trigger 49 is depressed to cause the pawl or end portion 48 of the arm 47 to be rotated in a counterclockwise direction forcing the end 48 upward under the clip adjacent the shoulders 46 and raising it to a position where the clip clears the shoulders. The clip thereupon slides down along the surface 64 of the arm 47 through the action of gravity. During this sliding movement the lower portion of the clip engages the lip 66 and the upper portion of the clip tips to eject the upper portion of the clip first so that the clip falls across the of the person's finger depressing the trigger 49. The clip can then be readily grasped between the thumb and finger of the operator so as to be ready for use.

In Figs. 13 and 14 there is shown another embodiment of the invention in which all parts are the same as in the first embodiment and the difference lies in the dispensing mechanism. In this embodiment the ejector mechanism includes a lift 81 movable vertically and having an inclined upper edge 82 shaped to engage the clip adjacent the shoulders 83. The member 81 is moved vertically by a trigger 84 pivotally mounted as by a pin 86 extending through the spaced members 87, only one of which is shown, and supported thereby. Movement of the trigger 84 is limited in one direction of movement by a pin 89 engaging a shoulder 88 on the trigger 84. Movement of the trigger 84 in the opposite direction is limited by engagement of a lug 91 on the vertically movable member 81 with the end of a slot 92 formed in the member 87 and through which the lug 91 projects. The slot 92 is positioned to guide the member 81 in its vertical movement. A spring 93 is disposed intermediate the spaced members 87 and has one end anchored to one of the members 87 and its opposite end resting on a shoulder 94 to maintain the vertically movable member in its lower position as shown in Fig. 13. Depression of the trigger 84 rotates the latter counter-clockwise and moves the member 81 vertically. This movement causes the clip adjacent the shoulders 83 to be moved upwardly and outwardly from the magazine and from frictional engagement with the remaining clips in the magazine. The edge 95 of the member 81 engages the clip adjacent the clip being ejected to maintain the latter in a fixed position as the clip adjacent the shoulders 83 is being ejected from the magazine. When the clip is raised to a position wherein the end 82 of the movable member 81 is in alinement with the top surface 96 of the spaced members 87 the clip slides down along the top surface and is conveyed to a point of use as described for the first embodiment of the invention.

In Figs. 15-18 there is shown still another embodiment of the dispensing mechanism. The magazine 101 is formed in the manner similar to that described for the embodiment shown in Figs. 3-9. The ejector mechanism however comprises a rotatable disc 102 interposed between side members 103 and 104 and supported thereby and having a shoulder 106 on its periphery shaped to engage the clip adjacent the spaced shoulders 107 against which the lowermost clip in the magazine rests. The rotatable disc 102 is formed with teeth 108. A rack member 109 formed with teeth 111 shaped to engage the teeth 108 on the disc 102 is provided for rotating the disc. The rack 109 is mounted between the spaced members 103 and 104 and is disposed for axial movement. The extreme outer end of the rack 109 is formed as a plunger 112. Movement of the rack is limited in one direction by engagement of the plunger 112 with a shoulder 113. Movement of the rack in the opposite direction is limited by engagement of a shoulder 114 with a shoulder 116 formed in the space between the members 103 and 104. A spring 118 disposed in the space between the members 103 and 104 normally biases the rack 109 to a position in which the plunger 112 extends axially outwardly from the ends of the spaced members 103 and 104. In this position of the parts the shoulder 106 on the disc 102 is disposed to be in alinement with the top surface 119 of the magazine 101 on which the clips slide. Axial movement of the plunger 112, as by engagement thereof with the operator's finger moves the rack 109 axially to rotate the disc 102. This rotation of the disc causes the clip adjacent the shoulders 107 to be forced up over the shoulders 107. As soon as the clip clears the shoulders 107 the clip is released from the disc 102 and thereafter through the action of gravity slides down along the upper edge portions of the spaced members 103 and 104. The portion of the side members 103 and 104 immediately below the disc 102 is removed as shown in Fig. 16 so that when a clip is raised to clear the shoulders 107 the bottom bridging portion of the clip does not engage the lower edges of the side members 103 and 104.

I claim:

1. In a dispenser for paper clips and the like, a support, a member for supporting a plurality of clips and mounted on said support, one end of said member being lower than the opposite end, said member having an upwardly extending transverse shoulder formed thereon disposed towards its lower end for retaining the clips thereon and having a longitudinal slot extending on both sides of said shoulder to form spaced side portions adjacent its lower end, means disposed in said slot and formed with a clip engaging portion movable upwardly at the side of said shoulder at which the clips are retained to engage the clip immediately adjacent the shoulder, and means disposed in said slot for moving said last means to move said clip over the shoulder to a position in which the clip passes over the spaced side portions at the lower end of said member.

2. In a dispenser for paper clips and the like, the combination of magazine means for storing clips in side by side relation and having an upwardly extending transverse shoulder formed thereon for retaining the clips in the magazine, said magazine being formed with a downwardly inclined upper surface at one side of said transverse shoulder, and an ejector movable between preselected positions, said ejector being disposed to engage the clip adjacent the shoulder in one position and in the other position raising the clip to a position in which the clip is free to pass over the shoulder and slide down the inclined upper surface of the magazine to be released therefrom, said ejector being shaped to maintain the clips adjacent the clip engageable by the ejector in a fixed position during movement of the ejector between its preselected positions and shaped to force the clip with which it is engageable into engagement with the shoulder to move the clip simultaneously upwardly and outwardly from the magazine.

3. In a dispenser for paper clips and the like, a support, a member for supporting a plurality of paper clips in side by side relation and having one end mounted on said support and its opposite end disposed at a lower level than said one end, said lower end being formed with aligned spaced upwardly extending transverse shoulders for retaining the clips on said member, said member being formed with a slot at its lower end extending axially past said shoulders and defined by spaced lower side portions of said member having downwardly inclined upper surfaces, an ejector mechanism disposed in said slot for movement between preselected positions, said ejector mechanism having a portion movable upwardly at the side of said shoulders at which the clips are retained to engage the paper clip abutting said shoulders to raise the clip to a position in which the clip is free to pass over the shoulders and to slide down the spaced side portions of the support member, and means for moving said ejector mechanism from one of its positions to its other position.

4. In a dispenser for paper clips and the like, a member for supporting a plurality of clips, means for mounting said member to feed the clips by gravity from one end thereof to the other, said member having a shoulder formed thereon for retaining said clips on said member, ejector means for moving one of said clips over the shoulder to a position in which the clip is free to slide down the ejector means to a clip receiving station, and means impeding the movement and supporting the lower portion of the clip as it slides down the ejector means whereby the upper portion of the clip rotates about the lower end of the clip to facilitate grasping the clip at the clip receiving station.

5. In a dispenser for articles, a support, a member for supporting a plurality of articles and mounted on said support to have one end lower than the opposite end, said member having shoulders formed thereon for retaining the articles thereon and having an axially extending slot formed at its lower end and extending past the shoulders to define spaced end portions, and a bell crank lever disposed in said slot and pivotally supported by said end portions for movement between preselected positions, said bell crank comprising a first arm having an end portion shaped to extend beyond the shoulder to be engageable with a single article and a second arm in the form of a trigger portion projecting outwardly from said end portions and capable when depressed of moving said first arm to move said article over the shoulder to a position in which the article is free to pass over the spaced end portions.

6. In a dispenser for paper clips and the like, the combination of magazine means for storing clips in side by side relation, said magazine being mounted to have one end lower than the other for feeding clips from the upper end to the lower end by the action of gravity, an ejector mechanism for ejecting a clip from the magazine comprising spaced guide surfaces disposed adjacent the end of the magazine and extending generally upwardly and axially outwardly from the magazine, a bell crank lever disposed between said surfaces and movable between preselected positions, said lever having an arm extending beyond said surfaces to engage the clip adjacent the surfaces in one position of the lever and in the other position of the lever said arm raising the clip to clear said surfaces, said arm being so shaped that during movement of the lever between its preselected positions the arm urges the clip into engagement with the guide surface to force the clip upwardly and outwardly from the magazine, and means for maintaining the clip, adjacent the clip being ejected, in a fixed position while the latter clip is urged against the guide surfaces to move it upwardly and outwardly away from the clip in the fixed position.

7. In a dispenser for paper clips or the like, a member for supporting a plurality of paper clips in side by side relation, means for mounting one end of said member at a higher level than the other end to feed clips from the upper end to the lower end by the action of gravity, said member being formed with shoulders intermediate its ends for retaining the paper clips on said member, said member being formed with a slot at its lower end extending axially thereof past the shoulders to define spaced end portions at the lower end of the member, a pivotally mounted bell crank lever disposed between said end portions and having an arm with a pawl portion formed thereon projecting beyond the shoulders on said member to engage a single clip, said lever being movable between a first position in which the end portion on the arm engages the clip abutting the shoulders and a second position in which the end portion on the arm raises the clip to a position in which the clip is passable over the shoulders, said bell crank having a trigger extending generally axially of said lower end of the member and movable to move the bell crank lever to its second position, and spring means for biasing said bell crank lever to its first position.

8. In a dispenser for articles, a member for supporting a plurality of articles, said support member having at least one upwardly extending transverse shoulder formed thereon at one side of said support for retaining the articles thereon and having a longitudinal slot extending on both sides of said shoulder and defined by spaced side portions of said support member, said spaced portions being formed with aligned upper surfaces at the opposite side of said shoulder inclined downwardly away from said shoulder, and an ejector disposed in said slot for movement between preselected positions and formed with an article-engaging portion movable upwardly at the side of said shoulder at which said articles are retained to engage a single article to move said article upwardly over said shoulder to a position in which said article is free to pass downwardly over the spaced side portions of the support member.

9. In a dispenser for articles, a member for supporting a plurality of articles in side by side relation and having an upwardly extending transverse shoulder formed thereon for retaining the articles thereon, said support member being formed with a downwardly inclined upper surface at the side of said transverse shoulder remote from the retained articles and being formed with a longitudinal slot extending on both sides of said transverse shoulder to form spaced side portions, an ejector member disposed in said slot for reciprocable movement to move at least a portion of its upper surface upwardly at the side of said transverse shoulder at which said articles are retained to move one of said articles upwardly, said reciprocable member being formed with an upper surface which in its extreme upper position is inclined downwardly toward the other side of said transverse shoulder to be aligned with the downwardly inclined upper surface on the support member to permit the article being ejected to slide down said aligned inclined surfaces to be released from the support member, and a lever pivotally mounted in said slot at the side of said transverse shoulder remote from the retained articles for engagement with said reciprocable ejector member to effect upward movement thereof.

10. In a dispenser for paper clips and the like, a magazine for supporting a plurality of clips in side by side relation, said magazine being mounted to have one end lower than the other end for feeding clips by gravity from the upper end to the lower end and being formed adjacent its lower end with an upwardly extending transverse shoulder for retaining the clips thereon, said magazine being formed with a longitudinal slot at its lower end extending on both sides of said transverse shoulder to form spaced side portions, said spaced side portions at the side of the transverse shoulder toward the lower end of the magazine being formed with aligned upper surfaces inclined downwardly toward the lower end of the magazine, an ejector member disposed in said slot for reciprocable movement to move at least a portion of its upper surface upwardly at the side of said transverse shoulder toward the upper end of the magazine to engage and move upwardly the clip immediately adjacent said shoulder, said reciprocable ejector member being formed with an upper surface which in its extreme upper position is inclined downwardly toward the lower end of the magazine to merge with the aligned inclined upper surfaces on said spaced side portions of the magazine at the lower end thereof to permit the clip being ejected to slide down said inclined surfaces to be released from the magazine, and means for effecting upward movement of said reciprocable ejector member.

11. In a dipenser for articles, a member for supporting a plurality of articles in side by side relation and having an upwardly extending transverse shoulder formed thereon for retaining the articles thereon, said support member being formed with a downwardly inclined upper surface at the side of said transverse shoulder remote from the retained articles and being formed with a longitudinal slot extending on both sides of said transverse shoulder to form spaced side portions, an ejector member disposed in said slot for angular movement about a pivotal axis to move a portion of its periphery upwardly at the side of said transverse shoulder on the support member at which said articles are retained, said ejector member being formed with a transverse peripheral shoulder disposed to engage and move upwardly one of said articles upon angular movement about its pivotal axis to move said article over the transverse shoulder on the support member into position to be supported by the downwardly inclined upper surface on the support member to slide down said inclined surface to be released from the support member, and means disposed in said slot for reciprocation longitudinally of the support member to effect angular movement of the ejector member about its pivotal axis.

12. In a dispenser for paper clips and the like, a magazine for supporting a plurality of clips in side by side relation, said magazine being mounted to have one end lower than the other end for feeding clips by gravity from the upper end to the lower end and being formed adjacent its lower end with an upwardly extending transverse shoulder for retaining the clips thereon, said magazine being formed with a longitudinal slot at its lower end extending on both sides of said transverse shoulder to form spaced side portions, said spaced side portions at the side of the transverse shoulder toward the lower end of the magazine being formed with aligned upper surfaces inclined downwardly toward the lower end of the magazine, a pivotally mounted ejector member disposed in said slot for angular movement, said ejector member being formed with a transverse peripheral shoulder movable upwardly at the side of said transverse shoulder on the magazine toward the upper end thereof to engage and move upwardly the clip immediately adjacent said magazine shoulder to move said clip over said magazine shoulder into position to be supported by the inclined upper surfaces on said spaced side portions of the magazine at the lower end thereof to permit the clip being ejected to slide down said inclined surfaces to be released from the magazine, and a member projecting beyond the lower end of said slot to be manually accessible and reciprocable in said slot longitudinally of the magazine to effect angular movement of the ejector member about its pivotal axis.

HUGO W. KRUSE.

REFERENCES CITED

The following references are of record in the file of this patent:

UNITED STATES PATENTS

| Number | Name | Date |
|---|---|---|
| 618,712 | McCall | Jan. 31, 1899 |
| 643,937 | Boggs | Feb. 20, 1900 |
| 672,331 | Peck | Apr. 16, 1901 |
| 1,217,372 | Vincent | Feb. 27, 1917 |
| 1,284,319 | Grover | Nov. 12, 1918 |
| 1,576,637 | Egelin | Mar. 16, 1926 |
| 2,086,922 | Peterson | July 13, 1937 |
| 2,156,743 | Skrebba | May 2, 1939 |
| 2,198,949 | Redman | Apr. 30, 1940 |
| 2,217,058 | Klotz | Oct. 8, 1940 |
| 2,340,894 | Morrell | Feb. 8, 1944 |
| 2,423,788 | Mueller-Molner | July 8, 1947 |